Feb. 8, 1927. 1,616,680
W. A. BUSIEK
RANGE
Filed Feb. 11, 1926

INVENTOR.
WILLIAM A. BUSIEK.
By Arthur C. Eckert
ATTORNEY.

Patented Feb. 8, 1927.

1,616,680

UNITED STATES PATENT OFFICE.

WILLIAM A. BUSIEK, OF BELLEVILLE, ILLINOIS.

RANGE.

Application filed February 11, 1926. Serial No. 87,626.

The object of my device is to make a range, particularly a gas range, and concerns itself principally with the oven of such a range. In order to bake or cook equally well in all portions of the oven, it becomes necessary to have all portions of the oven at the same temperature. If the oven is hotter at one portion than another, the article such as a cake, placed therein to bake will burn on one surface and not bake properly, if at all, on the other surface. Equality in temperature that is necessary is accomplished by means of a proper circulation of the products of combustion in and about the oven. In order to produce this circulation, a certain arrangement of flues and baffle plates is necessary. My device relieves the intense heat from the lower portion of the oven and for that reason, with my device it is possible to bake close to the oven bottom of the range without danger of burning the objects during the baking. Furthermore, by lengthening the path of the products of combustion from the burners to the flue, more radiation takes place into the oven and for that reason there is fuel economy because the stack temperatures are practically those of atmosphere.

A further object is to make an oven that is made of few and simple parts that lend themselves readily to multiple production and that can be easily and simply replaced.

With these and other objects in view, my invention has relation to certain novel features of construction and arrangement of parts as will be hereinafter more fully described, pointed out in the claim and illustrated in the drawings, in which, Fig. 1 is a longitudinal sectional elevation of my oven.

Figures 1, 2:
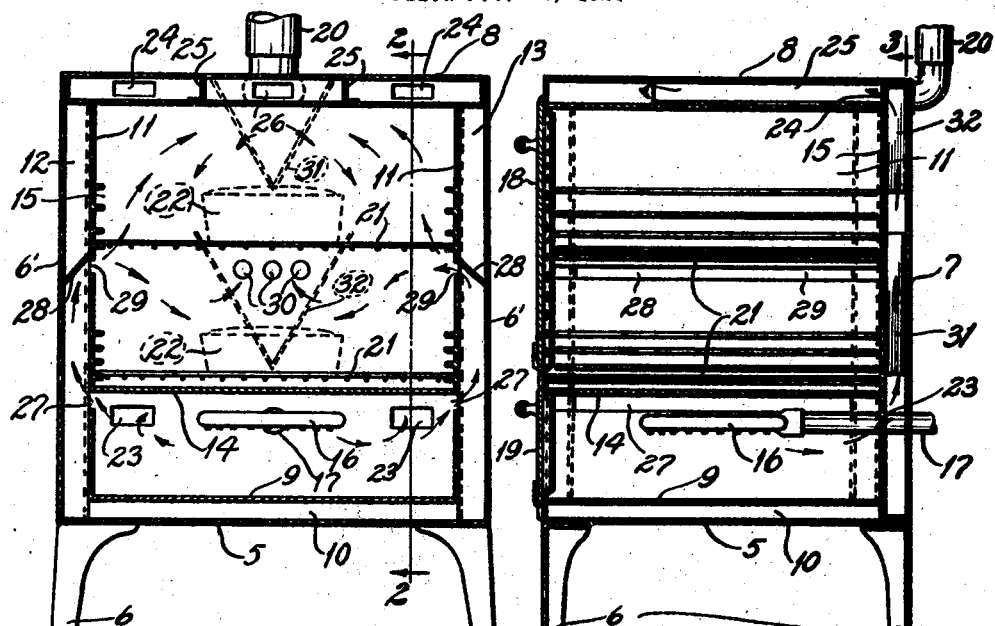
Fig. 2 is a longitudinal sectional elevation of my oven on the line 2—2 of Fig. 1.
Figure 3:
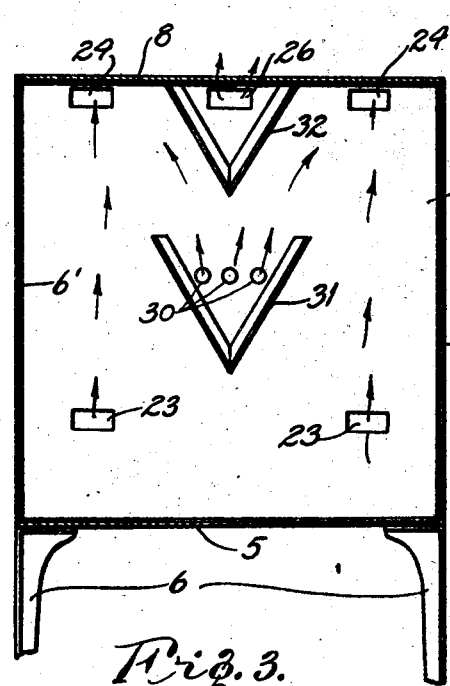
Fig. 3 is a rear elevation of my oven taken on the line 3—3 of Fig. 2.
Figure 4:
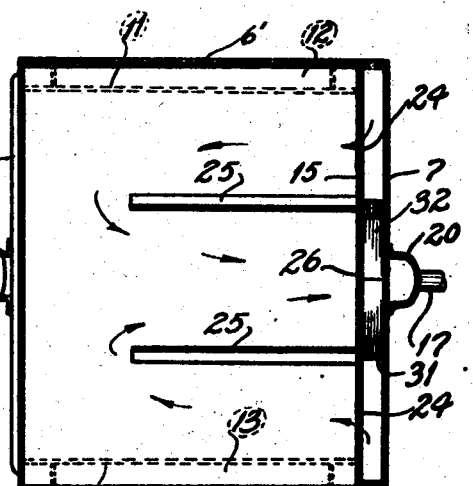
Fig. 4 is a sectional plan view of Fig. 2.

Numeral 5 designates the bottom of the range supported on the legs 6; numerals 6' designate the side walls, numeral 7 the rear wall, and numeral 8 the top.

In spaced relationship with the range bottom 5 is secured the oven bottom 9, the space between the range bottom and oven bottom forming the flue 10. Numerals 11 designate the side walls of the oven held in spaced relationship with the side walls of the range, forming flues 12 and 13. The interior of the oven is divided into an upper and lower portion by means of the plate 14 secured to the side walls 11 and the rear oven wall 15. The burner 16 is positioned in the portion of the oven below the plate 14. Numeral 17 designates the fuel supply pipe to the burner 16. Numeral 18 designates the oven door, covering the oven portion proper and numeral 19 designates a door covering the portion below the plate 14. Numeral 20 designates the flue stack, numerals 21 the oven shelves, and numerals 22 the objects to be baked. The structure thus far described is conventional. The products of combustion after leaving the burner 16 divide, take different paths, one inside the oven and the other outside of the oven and meet again in the flue stack 20. The path of the products of combustion is indicated with arrows. The path of the products of combustion outside of the oven is the following: Starting from the burner 16, they pass rearwardly through the openings 23 into the flue between the rear wall 7 and the rear oven wall 15; then upwardly to the top 8, then through the openings 24 into the space between the top 8 and the top of the oven, forwardly between the baffle plates 25 and the walls 11. The baffle plates 25 are secured to the inside of the top 8 and the outside of the oven top and at one end to the rear oven wall 15. The baffle plates 25 extend only a portion of the distance from the rear oven wall to the oven front. The products of combustion then pass around the ends of the baffle plate 25, then back and out of the flue opening 26. This tortuous path causes the heat to be radiated to the metal in its path. By conduction, the heat is transferred to the oven walls.

The second path of the products of combustion is the following: They leave the burner as before, travel laterally through the openings 27 into the flues 12 and 13, then upwardly until they meet the flue closing plates 28, where they are baffled inwardly through the openings 29 into the oven and then into the vents 30 formed in the rear wall of the oven, into the flue formed between the rear wall 7 and the rear oven wall 15. The products of combustion then travel upwardly between the arms of the V baffle 32, formed between the rear wall of the oven and the rear wall of the range, where they meet a second V baffle plate 31, divide and pass out of the openings 24, where they meet the products of combustion described in the first path, and continue with them to the flue stack 20.

What I claim and mean to secure by Letters Patent is—

In a range, an oven surrounded by flues, a source of heat, the source of heat and oven so arranged that the products of combustion from the source of heat are required to divide, one traveling through the rear flue, separating, traveling upwardly over the top of the oven, through the upper flue forwardly, around baffles, then rearwardly to the stack of the range, the other traveling laterally from the source of heat through openings in lateral walls, upwardly in the lateral flues, then being blocked or baffled and passing into the oven, then through vents in the rear oven wall, then upwardly between the back wall of the oven and the back wall of the range into the upper flue between the top of the oven and the top of the range, then forwardly with the first products of combustion to the stack.

In testimony whereof I affix my signature.

WILLIAM A. BUSIEK.